J. A. Reynolds,
Boring Wood,
Nº 16,399. Patented Jan. 13, 1857.
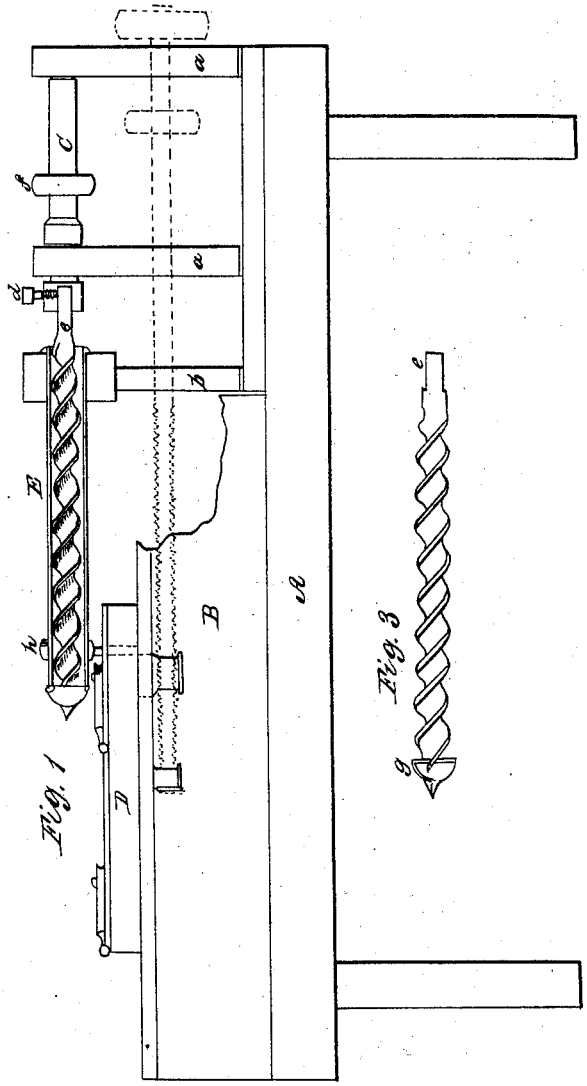
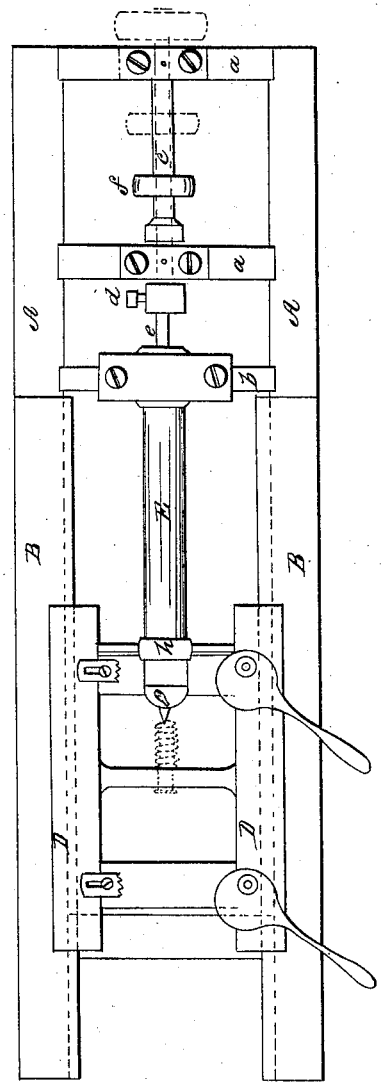

UNITED STATES PATENT OFFICE.

J. A. REYNOLDS, OF ELMIRA, NEW YORK.

TUBULAR AUGER.

Specification of Letters Patent No. 16,399, dated January 13, 1857.

*To all whom it may concern:*

Be it known that I, J. A. REYNOLDS, of Elmira, in the county of Chemung and State of New York, have invented certain new and useful Improvements in Augers for Boring Wood; and I do hereby declare that the following is a full, clear, and exact description of the same, reference being had to the accompanying drawings, making a part of this specification, of which—

Figure 1, is an elevation partly in section. Fig. 2, a plan or top view.

The nature of my improvements consists in so constructing a machine adapted to boring pump logs, that the auger being supported by a stationary tube through which it passes and upon whose end it is shouldered and supported, and having the cutter or bits of the auger slightly larger than the diameter of the guiding tube to admit of said tube readily passing into the cavity of the log in the progress of boring it; the bits or cutters being formed at or near an angle of 45°, for the purpose of cutting the grain of the wood at said angle both longitudinally and transversely therewith, thus effecting the boring of logs with great certainty of due centrality, with little friction in the delivery of the chips through the fixed tube, and with less power than heretofore employed. This gain of power resulting in great degree from the position or angle of the cutting edge of the bits, relatively to the grain of the timber, while the truth of line is in or from the support the bits derive from being shouldered on the end of the guide tube by which all tremor and deviation of line is prevented.

The log to be bored is clamped on a moving bed or carriage, actuated by a feed screw, turning by suitable pulleys in unison with the auger, and thus the machine performs the boring with little attendance therein.

To enable others skilled in the art to make and use my invention I will describe it as follows:

A A are timbers of a substantial frame supporting the head block, ($a\ a$) and tube block ($b$), all three being well bolted to said timbers; B B, are raised supports for the carriage, bolted to the frame timbers, they have projecting edges or tongues for entering grooves in the outer edges of the timbers of the carriage frame for supporting and moving the log to be bored.

D D is the log carriage; $c$ is the mandrel, having a socket at its outer end and set screw ($d$) for retaining the handle or stem of the auger ($e$) the screw of this auger resembles others but the head or cutters are novel, and will be presently described.

E is a metallic tube, surrounding the auger except the head; it is firmly held in its support ($b$) as it is not designed to turn; ($f$) is a pulley for turning the mandrel C and with it the auger; the head of the auger or cutter portion thereof has its rear part in form of a ring or washer against which the tube E bears; the edge of the cutter is shown in Fig. 3, at ($g$); the ring is slightly larger than the exterior of the tube E so that it shall cut a hole larger than the tube. The cutting edge is segmental, whose base is at an angle to the stem of the auger about 45°. The screw part of the auger is united with the head, so that the chips, cut as with a gouge may pass along the twist of the stem and be delivered at the rear end of the tube with little or no friction (the tube being perfectly smooth on its inside). On the inner end of the carriage is placed a stem and sliding collar ($h$) which moves on the tube E; ($i\ i$) are eccentric dogs, having sharp edges to enter the sides of the log and with the claws on the opposite side of the frame retain it, on the carriage. In the drawing they are represented as holding the log (or the position for holding).

F is a long feed screw passing through the head blocks and provided with pulleys for moving the screw, the thread enters a nut, secured to a cross piece of the carriage as seen in Fig. 1 and by the turning of the screw the carriage is moved in either direction and the log forced as bored upon the guide tube E.

I am aware that the employment of a tubular auger is not new, as one has been employed with the cutters attached to said tube. I am also aware that a tubular auger and screw thereon for the delivery of chips cut by the tube, have been employed.

Having described my improvement what I claim as my invention and desire to secure by Letters Patent is—

1. The employment of an auger, whose shank or stem shall form a screw, and whose head shall be constructed in the manner described, when combined with a grinding tube, E, surrounding the screw shank of the auger but not covering the head thereof, substantially in the manner and for the purposes set forth.

2. I claim the use of the guide tube E when combined with the sliding carriage D D said carriage constructed with the slide (*h*) as set forth.

In testimony whereof I have signed my name before two subscribing witnesses.

J. A. REYNOLDS.

Witnesses:
   CHARLES S. BAKER,
   M. S. SPAULDING.